US011740388B2

United States Patent
Tao et al.

(10) Patent No.: US 11,740,388 B2
(45) Date of Patent: *Aug. 29, 2023

(54) ANTI-GLARE FILM AND POLARIZER WITH THE SAME

(71) Applicant: BenQ Materials Corporation, Taoyuan (TW)

(72) Inventors: Tsun Sheng Tao, Taoyuan (TW); Chih-Wei Lin, Taoyuan (TW); Kuo-Hsuan Yu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 254 days.

This patent is subject to a terminal disclaimer.

(21) Appl. No.: 17/131,844

(22) Filed: Dec. 23, 2020

(65) Prior Publication Data

US 2021/0255366 A1 Aug. 19, 2021

Related U.S. Application Data

(63) Continuation-in-part of application No. 16/995,962, filed on Aug. 18, 2020.

(30) Foreign Application Priority Data

Feb. 13, 2020 (TW) .................................. 109104551
Dec. 1, 2020 (TW) .................................. 109142226

(51) Int. Cl.
| | | |
|---|---|---|
| *G02B 1/111* | (2015.01) | |
| *G02B 1/08* | (2006.01) | |
| *C09D 133/12* | (2006.01) | |
| *C09D 7/40* | (2018.01) | |
| *C09D 5/00* | (2006.01) | |
| *C09D 133/14* | (2006.01) | |
| *G02B 5/02* | (2006.01) | |
| *B82Y 40/00* | (2011.01) | |
| *B82Y 20/00* | (2011.01) | |
| *B82Y 30/00* | (2011.01) | |

(52) U.S. Cl.
CPC .............. *G02B 1/111* (2013.01); *C09D 5/006* (2013.01); *C09D 7/69* (2018.01); *C09D 133/12* (2013.01); *C09D 133/14* (2013.01); *G02B 1/08* (2013.01); *G02B 5/0242* (2013.01); *B82Y 20/00* (2013.01); *B82Y 30/00* (2013.01); *B82Y 40/00* (2013.01)

(58) Field of Classification Search
CPC .............. G02B 1/00–1/18; G02B 5/02–5/0294
See application file for complete search history.

(56) References Cited

U.S. PATENT DOCUMENTS

| | | | | |
|---|---|---|---|---|
| 6,896,960 B2 * | 5/2005 | Shoshi | ..................... | C08J 7/046 428/323 |
| 7,806,979 B2 * | 10/2010 | Chang | .................. | C09D 133/08 427/372.2 |
| 2009/0279176 A1 * | 11/2009 | Wang | ................... | G02B 5/0226 427/164 |
| 2021/0141129 A1 * | 5/2021 | Hayashi | ..................... | B32B 7/02 |

FOREIGN PATENT DOCUMENTS

| | | | | |
|---|---|---|---|---|
| CN | 105474054 A | | 4/2016 | |
| CN | 110119004 A | | 8/2019 | |
| JP | 2009157234 A | * | 7/2009 | |
| JP | 2009244305 A | * | 10/2009 | ............. G02B 1/105 |
| TW | 201946986 A | | 12/2019 | |
| WO | WO-2017188186 A1 | * | 11/2017 | ............... G02B 5/02 |

OTHER PUBLICATIONS

Machine translation of JP2009244305. Retrieved Jun. 18, 2022.*
Machine translation of JP2009157234. Retrieved Aug. 21, 2021.*
"BYK-333". BYK Additives & Instruments, (2012); pp. 1-4.*
"Radcure Coating Resins: ProductGuide". Allnex Group, (2014); pp. 1-36.*

* cited by examiner

*Primary Examiner* — Prashant J Khatri

(57) ABSTRACT

The present invention is to provide an anti-glare film. The anti-glare film comprises a polyethylene terephthalate (PET) substrate and an anti-glare layer formed on a surface of the PET substrate, wherein the anti-glare coating layer comprises 75 to 90 weight parts of an acrylic-based resin, 0.01 to 10 weight parts of silica nanoparticles 5 to 20 weight parts of organic microparticles and 0.05 to 2 weight parts of leveling agent. The anti-glare film has a total haze ranging between 35% and 50%, a surface haze ranging between 10% and 15% and a gloss at a viewing angle of 60 degrees between 30% and 50% thereof. The anti-glare film can provide satisfactory anti-glare properties, high precision, surface fineness, no flicker, good visibility and also fine adhesion between layers.

18 Claims, No Drawings

ANTI-GLARE FILM AND POLARIZER WITH THE SAME

CROSS-REFERENCE TO RELATED APPLICATION

This application claims the priority benefit of Taiwanese Application Serial Number 109104551, filed Feb. 13, 2020, and 109142226, filed Dec. 1, 2020, which is incorporated herein by reference.

TECHNICAL FILED

The present invention relates to an anti-glare film for display and a polarizer with the same.

BACKGROUND OF THE INVENTION

With the increasingly development of display technology, the performance requirements of a display, such as liquid crystal displays (LCD) or organic light-emitting diode displays (OLED), such as, high contrast, wide viewing angle, high brightness, thinning, larger-sized, high-resolution and diversified additional functions are proposed.

The anti-glare film with a rough surface is used on the surface of the display to achieve the anti-glare effect of light diffusion, however, when the surface roughness is increased to improve the anti-glare property of the anti-glare film, the whitening of the anti-glare layer will be caused, which will result in the decline of the visibility and contrast of the displayed image. With the development of high-resolution liquid crystal displays, the anti-glare film used in high-resolution displays requires a fine surface to prevent the clarity of the image from being affected, but this causes the external light to reflect on the display surface and brings the whitening of the display surface, and further, when the light generated by the internal backlight of the display passing through the rough surface of the anti-glare film on the display surface, the microlens effect may be produced and causes flicker inside, which is not conducive to the color reproducibility or clarity of the display, and affects the expected contrast, causes the decline of the image visibility.

In the prior art, the anti-glare film prepared from a triacetyl cellulose (TAC) film with the organic microparticles and/or nanoparticles coating have been proposed, but the moisture absorption of the TAC film can cause the poor weather resistance of the anti-glare film, polyethylene terephthalate (PET) and polymethyl methacrylate (PMMA) films with better weather resistance and good light transmittance replace TAC films as substrates of optical films. When the PMMA film is used as the substrate of anti-glare films, the particles can approach the upper edge of the coating to achieve anti-glare properties thereof because of the miscible effect between the coating and the substrate surface. However, when the PET film is used as the substrate of anti-glare films, the deficiency of the miscible effect between the coating and the substrate surface may resulting in the sedimentation of the particles, the anti-glare property of the anti-glare film may loss, and the shortage of the miscible effect also resulting in poor adhesion between the coating and the PET substrate.

The present invention proposes an anti-glare film using polyethylene terephthalate (PET) as a substrate, which can provide satisfactory anti-glare properties, surface fineness, high resolution, no flicker, good visibility and also fine adhesion between layers.

SUMMARY OF THE INVENTION

An object of the present invention is to provide an anti-glare film comprising a polyethylene terephthalate (PET) substrate and a cured anti-glare hard coating layer that is formed on a surface of the PET substrate. The cured anti-glare hard coating layer comprises 75 to 90 weight parts of the acrylic-based resin, 0.01 to 10 weight parts of silica nanoparticles, 5 to 20 weight parts of organic microparticles and 0.05 to 2 weight parts of leveling agent. The anti-glare film has a total haze ranging between 35% and 50%, a surface haze ranging between 10% and 15% and a gloss at a viewing angle of 60 degrees ranging between 30% and 50%.

The total haze of the present anti-glare film is preferably ranging between 40% and 50%, the internal haze is preferably ranging between 27% and 40% and the surface haze is preferably ranging between 10% and 13% thereof.

In the anti-glare film of the present invention, the content of the acrylic-based resin is preferably ranging between 80 and 90 weight parts. In the anti-glare film of the present invention, the average particle diameter of the organic microparticles used in the cured anti-glare hard coating layer is ranging from 1 μm to 6 μm and preferably ranging from 2 μm to 5 μm, and the usage amount of the organic microparticles is preferably between 7 and 15 weight percent.

In the anti-glare film of the present invention, the average primary particle diameter ($d_{50}$) of the silica nanoparticles used in the cured anti-glare hard coating layer is ranging from 5 nm to 30 nm and the average secondary particle diameter ($d_{50}$) thereof is ranging from 50 nm to 120 nm. The usage amount of the silica nanoparticles is preferably between 0.05 and 7 weight parts.

In the anti-glare film of the present invention, the usage content of the leveling agent is preferably ranging between 0.1 and 1 weight parts.

In the anti-glare film of the present invention, the acrylic-based resin of the cured anti-glare hard coating layer comprises (meth)acrylate compositions and an initiator, wherein the (meth)acrylate composition comprises a polyurethane (meth)acrylate oligomer of 35 to 50 weight parts with a functionality of 6 to 15, a (meth)acrylate monomer of 12 to 20 weight parts with a functionality of 3 to 6, and a (meth)acrylate monomer of 1.5 to 12 weight parts with a functionality less than 3, wherein the molecular weight of the polyurethane (meth)acrylate oligomer with a functionality of 6 to 15 is ranging from 1000 to 4500.

A further object of the present invention is to provide a polarizer comprising a polarizing element and an anti-glare film as above-disclosed formed thereon.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or methacrylate. The average primary particle size ($d_{50}$) of the particles refers to the particle size corresponding to the cumulative fineness distribution of the original particles reaching 50%. The average secondary particle size ($d_{50}$) of the particles refers to the particle size corresponding to the secondary cumulative fineness distribution of the agglomerate of original particles reaching 50%.

An object of the present invention is to provide an anti-glare film comprising a polyethylene terephthalate (PET) substrate and a cured anti-glare hard coating layer that is formed on a surface of the PET substrate. The cured anti-glare hard coating layer comprises 75 to 90 weight parts of an acrylic-based resin, 0.01 to 10 weight parts of silica nanoparticles, and 5 to 20 weight parts of organic microparticles. The anti-glare film has a total haze ranging between 35% and 50%, ae surface haze ranging between 10% and 15% and a gloss at a viewing angle of 60 degrees ranging between 30% and 50% thereof.

The present anti-glare film preferably has a total haze ranging between 40% and 50%, a internal haze ranging between 27% and 40%, and a surface haze preferably ranging between 10% and 13%. The surface haze of the present anti-glare film can effectively reduce the flicker of the display surface and the proper internal haze thereof destroys the internal scattering, so as to provide satisfactory anti-glare properties, surface fineness, high resolution, no flicker and good visibility. The present anti-glare film uses a PET film as the substrate to provide satisfactory anti-glare properties and surface fineness, and also has good adhesion between the anti-glare layer and the substrate.

In an embodiment of the anti-glare film of the present invention, the light transmittance of the PET substrate is more than 80% and preferably is more than 90%. The thickness of the PET substrate is ranging between 10 µm and 250 µm, and preferably ranging between 20 µm and 100 µm.

In an embodiment of the present invention, the thickness of the cured anti-glare hard coating layer is ranging from 3 µm to 9 µm, and preferably ranging from 4 µm to 7 µm.

In the anti-glare film of the present invention, the content of the acrylic-based resin is ranging between 75 and 90 weight parts, and preferably ranging between 80 and 90 weight parts.

The cured anti-glare hard coating layer of the present anti-glare film comprises organic microparticles and silica nanoparticles, wherein the addition of organic microparticles provides a light diffusion effect of the cured anti-glare hard coating layer, and gives an appropriate internal haze to homogenize the light emitted from the display. The refractivity, particle size and addition amount of the organic microparticles can adjust the internal haze of the present anti-glare film. The refractivity of the organic microparticles of the present invention is ranging between 1.0 and 1.60, and the average particle diameter thereof is ranging from 1 µm to 6 µm and preferably ranging from 2 µm to 5 µm. The usage amount of the organic microparticles is ranging between 5 and 20 weight parts and preferably ranging between 7 and 15 weight parts. When the usage amount of the organic microparticles is insufficient, the light diffusion effect of an anti-glare film will be reduced, and the display will be easily affected by the light reflection of the external light, which reduces the display quality. When the usage amount of the organic microparticles is excess, the light scattering effect of the anti-glare film will be over, and the display image will be prone to whitening and the contrast reduction of display may be occurred.

The suitable organic microparticles are polymethyl methacrylate resin microparticles, polystyrene resin microparticles, styrene-methyl methacrylate copolymer microparticles, polyethylene resin microparticles, epoxy resin microparticles, and silicone resin microparticles, polyvinylidene fluoride resin or polyvinyl fluoride resin microparticles with hydrophobic or hydrophilic surface treatment=. The organic microparticles can be selected from resin microparticles comprising styrene groups, or the organic microparticles are hydrophilic treated by, such as 2-hydroxyethyl(meth)acrylate (2-HE(M)A) or (meth)acrylonitrile.

In an embodiment of the anti-glare film of the present invention, the cured anti-glare hard coating layer comprises silica nanoparticles and the addition of the silica nanoparticles can promote the anti-settling of organic microparticles and increase the surface fineness of the cured anti-glare hard coating layer. The suitable average primary particle diameter ($d_{50}$) of the silica nanoparticles is ranging from 5 nm to 30 nm and the average secondary particle diameter ($d_{50}$) thereof is ranging from 50 nm to 120 nm. The usage amount of the silica nanoparticles is ranging between 0.01 and 10 weight parts and preferably ranging between 0.05 and 7 weight parts. When the usage amount of the silica nanoparticles is insufficient, the settle of the organic microparticles cannot be prevented, and the surface unevenness on the anti-glare film cannot be appropriately provided to increase the fineness. When the usage amount of the silica nanoparticles is excess, the dispersibility of the silica nanoparticles will be declined, which increases the haze of the anti-glare film and results in whitening and contrast reduction of the display.

In the anti-glare film of the present invention, the content of the leveling agent is preferably ranging between 0.1 and 1 weight parts.

In the anti-glare film of the present invention, the comprising of the leveling agent provides the uniform surface of the cured anti-glare hard coating layer, which brings about surface lubricity, stain resistance and abrasion resistance after the anti-glare hard coating layer is coated and cured thereafter. The suitable leveling agent can be a fluorine-based or silicone-based leveling agent, such as silicone oil or fluorine-based surfactant, preferably a leveling agent comprising a polyether modified polysiloxane.

The suitable leveling agent for the cured anti-glare hard coating layer of present anti-glare film, such as a polyether modified polysiloxane, is used in an amount ranging between 0.05 and 2 weight parts and preferably ranging between 0.2 and 1 weight parts. When the usage amount of the leveling agent is insufficient, the anti-glare hard coating layer may lack of leveling effect and the drying defects will occur during coating. When the usage amount of the leveling agent is excess, the excessive leveling agent will produce micelles in the anti-glare hard coating layer, reducing the physical properties of the anti-glare film.

In the anti-glare film of the present invention, the acrylic-based resin of the cured anti-glare hard coating layer comprises a (meth)acrylate compositions and an initiator, wherein the (meth)acrylate composition comprises a polyurethane (meth)acrylate oligomer of 35 to 50 weight parts with a functionality of 6 to 15, a (meth)acrylate monomer of 12 to 20 weight parts with a functionality of 3 to 6, and a (meth)acrylate monomer of 1.5 to 12 weight parts with a functionality less than 3, wherein the molecular weight of the polyurethane (meth)acrylate oligomer is ranging from 1000 to 4500. The above-mentioned acrylic-based resin provides a good adhesion between the cured hard coating layer and the PET substrate, and provides the anti-glare film with a good weather resistance, a sufficient surface hardness and an abrasion resistance.

In an embodiment of the present invention, the molecular weight of the polyurethane (meth)acrylate oligomer with a functionality of 6 to 15 is not less than 1,000, and preferably ranging between 1,500 and 4,500. In a preferred embodiment of the present invention, the polyurethane (meth)acrylate oligomer with a functionality of 6 to 15 is an aliphatic polyurethane (meth)acrylate oligomer with a functionality of 6 to 15.

In an embodiment of the present invention, the molecular weight of the (meth)acrylate monomer with a functionality of 3 to 6 is less than 1,000, and preferably less than 800. The suitable (meth)acrylate monomer with a functionality of 3 to 6 is selected from, such as, but not limited to, at least one of a group consisting of pentaerythritol tetra(meth)acrylate, dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A), pentaerythritol tri(meth)acrylate (PET(M)A) or combinations thereof, and preferably one selected from pentaerythritol triacrylate (PETA), dipentaerythritol hexaacrylate (DPHA) and dipentaerythritol pentaacrylate (DPPA) or combinations thereof.

In an embodiment of the present invention, the (meth)acrylate monomer with a functionality less than 3 is the (meth)acrylate monomer with a functionality of 1 or 2, and the molecular weight thereof is less than 500. The suitable (meth)acrylate monomer with a functionality less than 3 is selected from, such as at least one of a group consisting of 2-ethylhexyl (meth)acrylate (2-EH(M)A), 2-hydroxyethyl (meth)acrylate (2-HE(M)A), 3-hydroxypropyl (meth)acrylate (3-HP(M)A), 4-hydroxybutyl (meth)acrylate (4-HB(M)A), 2-butoxyethyl (meth)acrylate, 1,6-hexanediol di(meth)acrylate (HDD(M)A), cyclic trimethylolpropane formal (meth)acrylate (CTF(M)A), 2-phenoxyethyl (meth)acrylate (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate (DPGD(M)A), tripropylene glycol di(meth)acrylate (TPGD(M)A) and isobornyl (meth)acrylate (IBO(M)A), or combinations thereof.

The suitable initiator of the present acrylic-based resin can be selected from those commonly used in the related art, such as, but not limited to, acetophenones, diphenylketones, propiophenones, benzophenones, α-hydroxyketones, fluorenylphosphine oxides and the like. The above-mentioned initiators can be used alone or in combination.

In other embodiments of the present invention, additive, other additives such as antistatic agents, colorants, flame retardants, ultraviolet absorbers, antioxidants or surface modifiers can be added to the aforementioned acrylic-based resin as required.

Other optical functional layers, for example, a low-refractive layer for providing anti-reflection, can also optionally be applied on the present anti-glare film.

The method for preparing the present anti-glare film comprises the steps of, mixing a polyurethane (meth)acrylate oligomer with a functionality of 6 to 15, a (meth)acrylate monomer with a functionality of 3 to 6, a (meth)acrylate monomer with a functionality less than 3, a initiator and a suitable solvent evenly to form a acrylic-based resin; adding organic microparticles and/or silica nanoparticles, a leveling agent, an additive and an organic solvent to the acrylic-based resin, and furtherly mixing evenly to form an anti-glare hard coating solution; coating the anti-glare hard coating solution on a transparent substrate and drying the coated substrate thereafter; and curing the anti-glare hard coating solution via radiation or electron beam to form a cured anti-glare hard coating layer on the substrate to obtain an anti-glare film.

The solvents suitable for preparation of the present anti-glare film can be the organic solvents commonly used in the related art, such as ketones, aliphatic, cycloaliphatic or aromatic hydrocarbons, ethers, esters or alcohols. One or more organic solvents can be used in the acrylic-based resin. The suitable organic solvent can be such as, acetone, butanone, cyclohexanone, methyl isobutyl ketone, hexane, cyclohexane, dichloromethane, dichloroethane, toluene, xylene, propylene glycol methyl ether, methyl acetate, ethyl acetate, propyl acetate, butyl acetate, n-butanol, isobutanol, isopropanol, diacetone alcohol, propylene glycol methyl ether acetate, cyclohexanol or tetrahydrofuran and the likes, but not limited thereto.

The above-mentioned anti-glare hard coating solution can be applied to the substrate surface by any method known in the related art, for example, bar coating, blade coating, dip coating, roll coating, spinning coating, slot-die coating and the like.

The present anti-glare film can be combined with other functional optical films to form a composite optical film. A functional optical film that can be used is, for example, a polarizer, where the polarizer can be located on the other side of the transparent substrate of the anti-glare film opposite to the cured anti-glare hard coating layer.

According to the present anti-glare film disclosed, in another embodiment of the present invention, there is further provided a polarizer comprising the polarizing element as above formed thereon.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

EXAMPLE

Preparation Example 1: Preparation of Acrylic-Based Resin I 42 g of polyurethane acrylate (functionality of 6, viscosity at 25° C. is about 30,000 cps, available from IGM Resins International Trading Taiwan Ltd., Taiwan), 4.5 g of pentaerythritol triacrylate (PETA), 12 g of dipentaerythritol hexaacrylate (DPHA), 3 g cyclotrimethylolpropane methylal acrylate (CTFA), 4 g of initiator (Chemcure-481, available from Chembridge International Co., Ltd., Taiwan), 24.5 g of ethyl acetate (EAC) and 10 g of n-butyl acetate (nBAC) were mixed for 1 hour to form an acrylic-based resin I with a solid content of 65.5%.

Preparation Example 2: Preparation of Acrylic-Based Resin II 40.5 g of polyurethane acrylate (the functionality of 9, the molecular weight is about 2,000, the viscosity at 25° C. is about 86,000 cps, available from Allnex, US), 4.5 g of pentaerythritol triacrylate (PETA), 10.5 g of dipentaerythritol hexaacrylate (DPHA), 4.5 g hexanediol diacrylate (HDDA), 1.5 g 2-phenoxyethyl acrylate (PHEA), 3.5 g of initiator (Chemcure-481), 3.5 g of photoinitiator (TR-PPI-ONE, available from Tronly Enterprise Co., Ltd., Hong Kong), 24.5 g of ethyl acetate (EAC) and 10 g of n-butyl acetate (nBAC) were mixed for 1 hour to form an acrylic-based resin II with a solid content of 65.5%.

Example 1

199 g of the resin I, 7.4 g of hydrophobic-modified silica nanoparticle dispersion sol (NanoBYK-3650, solid content 31%, solvent: propylene glycol methyl ether acetate/propylene glycol monomethyl ether, available from BYK, Germany), 5.3 g of polyether-modified polydimethylsiloxane leveling agent (BYK-333, solid content 10%, solvent: ethyl acetate, available from BYK, Germany), 19.6 g of polystyrene microparticles (SSX-303ABE, average particle size 3.0 μm, refractive index 1.59, available from Sekisui Plastics Co., Ltd., Japan), 48.3 g of propylene glycol methyl ether acetate (PMA) and 100 g of n-butyl acetate (nBAC) were mixed for 1 hour to form an anti-glare hard coating solution.

The prepared anti-glare hard coating solution was coated on a surface of a polyethylene terephthalate (PET) substrate with a thickness of 80 μm, and then the anti-glare hard coating solution was dried and cured by a UV lamp with a radiation dose of 80 mJ/cm$^2$ under a nitrogen atmosphere. Thus, an anti-glare film comprising a cured anti-glare hard coating layer with a thickness of 4.2 μm formed on a surface of the PET substrate was obtained.

The properties of the obtained anti-glare film were determined in accordance with the measurement described hereinafter. The test results of light transmittance, total haze, internal haze, surface haze, gloss, clarity and anti-glare evaluation were shown in Table 1, and the test results of abrasion resistance, hardness and adhesion were shown in Table 2.

Example 2

199 g of the resin II, 0.5 g of hydrophobic-modified silica nanoparticle dispersion sol (NanoBYK-3650, solid content 31%, solvent: propylene glycol methyl ether acetate/propylene glycol monomethyl ether, available from BYK, Germany), 5.2 g of polyether-modified polydimethylsiloxane leveling agent (BYK-333, solid content 10%, solvent: ethyl acetate, available from BYK, Germany), 16.3 g of polystyrene microparticles (XX-35IK, average particle size 3.8 μm, refractive index 1.59, available from Sekisui Plastics Co., Ltd., Japan), 37.4 g of ether acetate(EAC) and 112 g of methyl isobutyl ketone (MIBK) were mixed for 1 hour to form an anti-glare hard coating layer solution.

The prepared anti-glare hard coating solution was coated on a surface of a polyethylene terephthalate (PET) substrate with a thickness of 80 μm, and then the anti-glare hard coating solution was dried and cured by a UV lamp with a radiation dose of 80 mJ/cm$^2$ under a nitrogen atmosphere. Thus, an anti-glare film comprising a cured anti-glare hard coating layer with a thickness of 5.0 μm formed on a surface of the PET substrate was obtained.

The properties of the obtained anti-glare film were determined as in Example 1, and the test results were shown in Table 1 and 2.

Example 3

212 g of the resin II, 21.6 g of silica nanoparticle dispersion sol (MEK-9130X, solid content 30%, solvent: butanone, available from Evonik United Silica Industrial Ltd., Taiwan), 5.4 g of polyether-modified polydimethylsiloxane leveling agent (BYK-307, solid content 10%, solvent: ethyl acetate, available from BYK, Germany), 16.2 pg of polystyrene microparticles (XX-29IK, average particle size 3.5 μm, refractive index 1.59, available from Sekisui Plastics Co., Ltd., Japan), 39.45 g of n-propyl acetate (nBAC), 39.45 g of n-butyl acetate (nPAC) and 72.5 g of methyl isobutyl ketone (MIBK) were mixed for 1 hour to form an anti-glare hard coating solution.

The prepared anti-glare hard coating solution was coated on a surface of a polyethylene terephthalate (PET) substrate with a thickness of 80 μm, and then the anti-glare hard coating solution was dried and cured by a UV lamp with a radiation dose of 80 mJ/cm$^2$ under a nitrogen atmosphere. Thus, an anti-glare film comprising a cured anti-glare hard coating layer with a thickness of 4.4 μm formed on a surface of the PET substrate was obtained.

The properties of the obtained anti-glare film were determined as in Example 1, and the test results were shown in Table 1 and 2.

Example 4

199 g of the resin II, 3.6 g of hydrophobic-modified silica nanoparticle dispersion sol (NanoBYK-3650, solid content 31%, solvent: propylene glycol methyl ether acetate/propylene glycol monomethyl ether, available from BYK, Germany), 5.3 g of polyether-modified polydimethylsiloxane leveling agent (BYK-333, solid content 10%, solvent: ethyl acetate, available from BYK, Germany), 16.3 g of polystyrene microparticles (SSX-303ABE), 36.8 g of ethyl acetate (EAC) and 112 g of methyl isobutyl ketone (MIBK) were mixed for 1 hour to form an anti-glare hard coating solution.

The prepared anti-glare hard coating solution was coated on a surface of a polyethylene terephthalate (PET) substrate with a thickness of 80 μm, and then the anti-glare hard coating solution was dried and cured by a UV lamp with a radiation dose of 80 mJ/cm$^2$ under a nitrogen atmosphere. Thus, an anti-glare film comprising a cured anti-glare hard coating layer with a thickness of 4.3 μm formed on a surface of the PET substrate was obtained.

The properties of the obtained anti-glare film were determined as in Example 1, and the test results were shown in Table 1 and 2.

Example 5

212 g of the resin II, 32.4 g of silica nanoparticle dispersion sol (MEK-9130X, solid content 30%, solvent: butanone, available from Evonik United Silica Industrial Ltd., Taiwan), 5.4 g of polyether-modified polydimethylsiloxane leveling agent (BYK-307, solid content 10%, solvent: ethyl acetate, available from BYK, Germany), 13 g of polystyrene microparticles (XX-31IK, average particle size 3.8 μm, refractive index 1.59, available from Sekisui Plastics Co., Ltd., Japan), 39.45 g of n-propyl acetate (nBAC), 39.45 g of n-butyl acetate (nPAC) and 72.5 g of methyl isobutyl ketone (MIBK) were mixed for 1 hour to form an anti-glare hard coating solution.

The prepared anti-glare hard coating solution was coated on a surface of a polyethylene terephthalate (PET) substrate with a thickness of 80 μm, and then the anti-glare hard coating solution was dried and cured by a UV lamp with a radiation dose of 80 mJ/cm$^2$ under a nitrogen atmosphere. Thus, an anti-glare film comprising a cured anti-glare hard coating layer with a thickness of 4.6 μm formed on a surface of the PET substrate was obtained.

The properties of the obtained anti-glare film were determined as in Example 1, and the test results were shown in Table 1 and 2.

Optical Properties Measurement

The optical properties of the anti-glare films obtained from the Examples were measured according to Japanese Industrial Standard (JIS) test methods.

Light transmittance measurement: The light transmittance was measured according to the test method of JIS K7361 by NDH-2000 Haze Meter (manufactured by Nippon Denshoku Industries, Japan).

Total haze measurement: The total haze was measured according to the test method of JIS K7136 by NDH-2000 Haze Meter.

Internal haze and surface haze measurement: The anti-glare films adhered to a triacetyl cellulose substrate with transparent optical adhesive (T40UZ, thickness 40 μm, available from Fujifilm, Japan), flattening the uneven surface of the anti-glare film. In this state, the haze of prepared sample was measured according to the test method of JIS K7136 by NDH-2000 Haze Meter was the internal haze, and the surface haze could be obtained from the total haze deducted the internal haze.

Gloss measurement: The gloss of the anti-glare films were obtained by adhering the anti-glare films to a black acrylic plate and measuring the gloss thereof according to the test method of JIS Z8741 by BYK Micro-Gloss gloss meter at viewing angles of 20, 60 and 85 degrees.

Clarity measurement: Measuring the anti-glare film according to the test method of JIS K7374 by SUGA ICM-IT image clarity meter, and the sum of the measured values at slits of 0.125 mm, 0.25 mm, 0.50 mm, 1.00 mm and 2.00 mm was the clarity.

Anti-glare evaluation: The anti-glare films were adhered to a black acrylic plate, and the surfaces of the prepared samples were illuminated by 2 fluorescent tubes to check the status of reflected by visual observation. The evaluation criteria were as below.

Lv.1: Two separate fluorescent tubes could be seen clearly and the straight outlines of tubes was distinguished obviously;

Lv.2: Two separate fluorescent tubes could be seen clearly, but the outlines of tubes were slightly fuzzy;

Lv.3: Two separate fluorescent tubes could be seen, and although the outlines of tubes were slightly fuzzy but the shapes of tubes could be distinguished;

Lv.4: It could be seen that there are 2 fluorescent tubes, but the shapes of tubes could not be distinguished;

Lv.5: It could not be seen that there are 2 fluorescent tubes and the shapes of tubes could not be distinguished.

TABLE 1

The optical properties test results of the anti-glare films obtained from Examples 1 to 5

|  |  | Example 1 | Example 2 | Example 3 | Example 4 | Example 5 |
|---|---|---|---|---|---|---|
| Light transmittance (%) |  | 91.56 | 91.67 | 91.80 | 91.89 | 91.80 |
| Haze (%) | Total haze | 44.30 | 46.89 | 48.20 | 43.77 | 40.30 |
|  | Surface haze | 11.42 | 11.89 | 11.90 | 12.20 | 11.15 |
|  | Internal haze | 32.88 | 35.00 | 36.30 | 31.57 | 29.15 |
| Gloss (%) | 20° | 8.1 | 6.9 | 9.0 | 8.9 | 10.2 |
|  | 60° | 40.7 | 32.8 | 48.8 | 45.6 | 41.3 |
|  | 85° | 71.7 | 78.5 | 87.7 | 85.3 | 83.6 |
| Clarity (%) |  | 31.7 | 113.2 | 295 | 200 | 293 |
| Anti-glare evaluation |  | Lv. 4 | Lv. 4 | Lv. 4 | Lv. 4 | Lv. 4 |

Abrasion Resistance, Hardness and Adhesion Test

Abrasion resistance test: The surfaces of the anti-glare films were rubbed by steel wood #0000 with a load of 250 g/cm$^2$ for 10 times to check if scratches were made on the film surface by visual observation.

Hardness test: The hardness was tested according to the test method of JIS K5400 by automatic pencil hardness tester with standard hardness pencil (available from Mitsubishi Pencil, Japan) of hardness 2H, and checked if scratches were made on the surface under 5 times of test by visual observation. If there had no scratch on the surface, it was marked as "0/5".

Adhesion test: The adhesion to substrate was tested according to the test method of JIS K 5600-5-6 by cross-cut tester.

TABLE 2

The test results of the anti-glare films obtained from Examples 1 to 5 of abrasion resistance, hardness and adhesion

|  | Example 1 | Example 2 | Example 3 | Example 4 | Example 5 |
|---|---|---|---|---|---|
| Abrasion resistance (250 gf/cm$^2$) number of scratches were made | 0 | 0 | 0 | 0 | 0 |
| Hardness (2H) | 0/5 | 0/5 | 0/5 | 0/5 | 0/5 |
| Adhesion (%) | 100/100 | 100/100 | 100/100 | 100/100 | 100/100 |

As shown in Table 1 and 2, the present anti-glare films provides good optical properties, good adhesions to a polyethylene terephthalate (PET) substrate, and the present anti-glare films exist excellent abrasion resistances.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. An anti-glare film, comprising:
a polyethylene terephthalate (PET) transparent substrate; and
a cured anti-glare hard coating layer formed on a surface of the polyethylene terephthalate (PET) transparent substrate, wherein the cured anti-glare hard coating layer comprising:
75 to 90 weight parts of an acrylic-based resin;
0.01 to 10 weight parts of silica nanoparticles;
5 to 20 weight parts of organic microparticles; and
0.05 to 2 weight parts of leveling agent;
wherein the leveling agent is a polyether modified polysiloxane leveling agent, and the anti-glare film has a total haze greater than 40% and less than or equal to 50%, a surface haze ranging between 10% and 15% and a gloss at a viewing angle of 60 degrees between 30% and 50% thereof.

2. The anti-glare film as claimed in claim 1, wherein the total haze of the anti-glare film is ranging between 40% and 50%, the internal haze is ranging between 27% and 40%, and the surface haze is ranging between 10% and 13% of the anti-glare film thereof.

3. The anti-glare film as claimed in claim 1, wherein the average particle diameter of the organic microparticles used in the anti-glare hard coating layer is ranging from 2 μm to 6 μm.

4. The anti-glare film as claimed in claim 2, wherein the average particle diameter of the organic microparticles used in the anti-glare hard coating layer is ranging from 2 μm to 5 μm.

5. The anti-glare film as claimed in claim 1, wherein the average primary particle diameter ($d_{50}$) of the silica nanoparticles used in the anti-glare hard coating layer is ranging from 5 nm to 30 nm and the average secondary particle diameter ($d_{50}$) thereof is ranging from 50 nm to 120 nm.

6. The anti-glare film as claimed in claim 1, the content of the acrylic-based resin is ranging between 80 and 90 weight parts.

7. The anti-glare film as claimed in claim 1, the usage amount of the organic microparticles is ranging between 7 and 15 weight parts.

8. The anti-glare film as claimed in claim 1, wherein the usage amount of the silica nanoparticles is ranging between 0.05 and 7 weight parts.

9. The anti-glare film as claimed in claim 1, the usage content of the leveling agent is ranging between 0.1 and 1 weight parts.

10. The anti-glare film as claimed in claim 1, wherein the organic microparticles are polymethyl methacrylate resin microparticles, polystyrene resin microparticles, styrene-methyl methacrylate copolymer microparticles, polyethylene resin microparticles, epoxy resin microparticles, silicone resin microparticles, polyvinylidene fluoride resin or polyvinyl fluoride resin microparticles with hydrophilic or hydrophobic surface treatment.

11. The anti-glare film as claimed in claim 1, wherein the refractivity of the organic microparticles is ranging between 1.40 and 1.60.

12. The anti-glare film as claimed in claim 1, wherein the thickness of the cured anti-glare hard coating layer is ranging between 3 μm and 9 μm.

13. The anti-glare film as claimed in claim 1, wherein the acrylic-based resin of the anti-glare hard coating layer comprises a (meth)acrylate composition and an initiator, wherein the (meth)acrylate composition comprises;
a polyurethane (meth)acrylate oligomer of 35 to 50 weight parts with a functionality of 6 to 15;
a (meth)acrylate monomer of 12 to 20 weight parts with a functionality of 3 to 6; and
a (meth)acrylate monomer of 1.5 to 12 weight parts with a functionality less than 3.

14. The anti-glare film as claimed in claim 13, wherein the polyurethane (meth)acrylate oligomer with a functionality of 6 to 15 is an aliphatic polyurethane (meth)acrylate oligomer with a functionality of 6 to 15.

15. The anti-glare film as claimed in claim 13, wherein the (meth)acrylate monomer with a functionality of 3 to 6 is selected from at least one of a group consisting of pentaerythritol tetra(meth)acrylate, dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A) and pentaerythritol tri(meth)acrylate (PET(M)A), or combinations thereof.

16. The anti-glare film as claimed in claim 13, wherein the (meth)acrylate monomer with a functionality less than 3 is selected from at least one of a group consisting of 2-ethylhexyl (meth)acrylate (2-EH(M)A), 2-hydroxyethyl (meth)acrylate (2-HE(M)A), 3-hydroxypropyl (meth)acrylate (3-HP(M)A), 4-hydroxybutyl (meth)acrylate (4-HB(M)A), 2-butoxyethyl (meth)acrylate, 1,6-hexanediol di(meth)acrylate (HDD(M)A), cyclic trimethylolpropane formal (meth)acrylate (CTF(M)A), 2-phenoxyethyl (meth)acrylate (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate (DPGD(M)A), tripropylene glycol di(meth)acrylate (TPGD(M)A) and isobornyl (meth)acrylate (IBO(M)A), or combinations thereof.

17. The anti-glare film as claimed in claim 13, wherein the initiator is selected from at least one of a group consisting of acetophenones initiator, diphenylketones initiator, propiophenones initiator, benzophenones initiator, α-hydroxyketones initiator and fluorenylphosphine oxides initiator, or combinations thereof.

18. A polarizer comprising a polarizing element, wherein an anti-glare film as claimed in claim 1 is formed on a surface of the polarizing element of the polarizer.

* * * * *